United States Patent [19]

Siccardi

[11] Patent Number: 5,233,915
[45] Date of Patent: Aug. 10, 1993

[54] STEAM INJECTION NOZZLE FOR BEVERAGES

[75] Inventor: Alberto Siccardi, Milan, Italy

[73] Assignee: Spidem S.r.l., Cerchiate di Pero, Italy

[21] Appl. No.: 865,153

[22] Filed: Apr. 8, 1992

[30] Foreign Application Priority Data

Apr. 19, 1991 [IT] Italy .................... 001082 A/91

[51] Int. Cl.⁵ .................... A47J 43/12; A47J 31/46
[52] U.S. Cl. ........................ 99/293; 99/275; 99/300; 99/323.1; 239/520; 261/119.1; 261/123; 261/DIG. 16; 261/DIG. 76
[58] Field of Search .......... 99/293, 294, 295, 300, 99/301, 307, 275, 323.1, 452; 239/518, 520; 261/119.1, 123, DIG. 16, DIG. 76; 366/101, 165

[56] References Cited

U.S. PATENT DOCUMENTS

| 229,637 | 7/1880 | Redmond et al. | 239/518 X |
|---|---|---|---|
| 426,512 | 4/1890 | Parker | 239/520 X |
| 515,837 | 3/1894 | Mullaney | 239/520 X |
| 848,340 | 3/1907 | Bentz | 261/123 X |
| 1,535,491 | 4/1925 | Partlow | 239/520 X |
| 3,081,949 | 3/1963 | Simmons | 239/520 X |
| 3,923,483 | 12/1975 | Hilmer et al. | 261/DIG. 76 X |
| 3,952,642 | 4/1976 | Vitous | 99/300 |
| 3,987,715 | 10/1976 | Muller | 99/275 |
| 4,735,133 | 4/1988 | Paoletti | 99/323.1 X |
| 4,800,805 | 1/1989 | Mahlich et al. | 99/323.1 X |
| 4,852,473 | 8/1989 | Bolivar | 99/323.1 X |
| 4,921,640 | 5/1990 | Wu | 99/293 X |
| 4,960,042 | 10/1990 | Grossi | 99/293 |

FOREIGN PATENT DOCUMENTS

| 0195750 | 9/1986 | European Pat. Off. |  |
| 0287906 | 10/1988 | European Pat. Off. |  |
| 3942713 | 6/1991 | Fed. Rep. of Germany |  |
| 1539346 | 9/1968 | France | 239/518 |
| 578154 | 6/1958 | Italy | 99/275 |
| 90/10411 | 9/1990 | PCT Int'l Appl. |  |
| 682274 | 8/1989 | U.S.S.R. | 239/250 |

*Primary Examiner*—Stephen F. Gerrity
*Attorney, Agent, or Firm*—Guido Modiano; Albert Josif

[57] ABSTRACT

The steam ejection nozzle comprises an elongated body which internally defines a chamber. One end of the body is open for coupling to a steam delivery duct and the other end has a plurality of steam discharge outlets. The steam ejection nozzle furthermore comprises a lamination cone which can be partially immersed within a fluid to be emulsified. The lamination cone is skimmed by the flow of steam discharged from the outlets in order to facilitate penetration of the steam into the liquid and create a vortex which increases the inclusion of air.

4 Claims, 1 Drawing Sheet

STEAM INJECTION NOZZLE FOR BEVERAGES

BACKGROUND OF THE INVENTION

The present invention relates to a steam ejection nozzle for beverages.

Coffee-making machines of the professional type, i.e. for public concerns, for preparing hot beverages or for heating beverages in general, such as milk, water, chocolate and the like, use a nozzle for ejecting pressurized steam which produces, especially in milk-based beverages, a surface foam which distinguishes public-concern products from those which can be obtained with coffee-making machines for household use.

Actually, the real problem observed in coffee-making machines for household use with respect to professional ones is most of all related to the amount of steam which can be used to perform emulsification which produces the foam, which is greatly appreciated by consumers.

In fact, while professional coffee-making machines allow steam jets of considerable intensity, in coffee-making machines for household use the steam jet is limited by the capacity of the boiler built into the machine, i.e. by the amount of water which can be heated by the coffee-making machine for household use.

Furthermore, the skill of the operator is always necessary in order to obtain a considerable amount of foam.

In order to try to solve this problem, steam dispensing units have already been provided which are structured so as to facilitate the foaming of milk even with reduced amounts of steam.

A first known solution provides for a nozzle around the steam delivery duct which has a chamber connected to the outside by means of a hole which draws in air which is mixed with the liquid, so as to increase the amount of foam. Furthermore, in order to achieve a better foaming of the beverage, it is possible to provide a second hole, defined adjacent to the delivery duct, which allows to draw the beverage into said chamber, thus producing a forced and vortical circulation of the beverage both inside and outside the chamber delimited around the delivery channel.

Although this solution functionally solves the described problem, it generally has problems in providing a correct and complete cleaning of the delivery nozzle.

Another solution provides a turbine which is driven by steam and is arranged at the surface of the beverage so as to provide a vortical motion of the liquid which constitutes said beverage, thus emulsifying and foaming it.

This solution is structurally complicated and does not allow easy cleaning.

SUMMARY OF THE INVENTION

The aim of the present invention is to eliminate or substantially reduce the problems described above in known types of nozzles for coffee-making machines for household use by providing a steam ejection nozzle which substantially reduces constructive complexity.

Within the scope of the above aim, an object of the present invention is to provide a steam ejection nozzle which is easy to clean.

Not least object of the present invention is to provide a steam ejection nozzle for beverages which is easy to manufacture and competitive from an economic standpoint.

This aim, the objects mentioned and others which will become apparent hereinafter are achieved by a steam ejection nozzle for beverages as defined in the appended claims.

BRIEF DESCRIPTION OF THE DRAWINGS

Further characteristics and advantages of the invention will become apparent from the description of some preferred but not exclusive embodiments of the steam ejection nozzle according to the invention, illustrated only by way of non-limitative example in the accompanying drawings, wherein.

DESCRIPTION OF THE PREFERRED EMBODIMENTS

Figure 1:
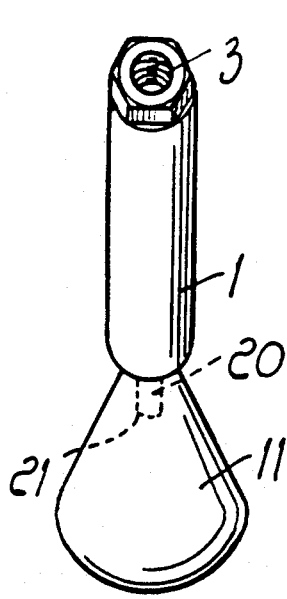
FIG. 1 is a perspective view of a first embodiment of the steam ejection nozzle according to the invention.

With reference to the above figures, the steam ejection nozzle according to the invention comprises an elongated body, designated by the reference numeral 1, which internally defines a chamber 2. The body 1, which is preferably cylindrical, has an open end 3 which can be coupled to a steam delivery duct 4 and has, at the other end 5 thereof, a plurality of steam discharge outlets 6. The open end 3 is at least partially internally threaded.

The device furthermore comprises lamination means 10 or 11 which can be partially immersed within a second fluid 7. Said lamination means are rigidly associated with the body 1 at the end 5 and one of their axes coincides with the axis defined by the blind hollow element 1.

Figure 5:
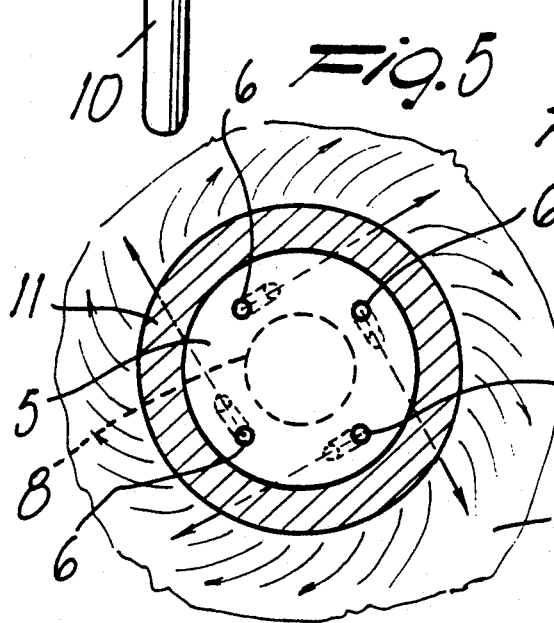
FIG. 5 is a sectional plan view, taken along the plane V—V of FIG. 4.

The discharge outlets 6 are furthermore arranged along a path, as more clearly illustrated in FIG. 5, which is adjacent to the outer perimeter 8 of a portion where the lamination means 10, 11 make contact with the blind end 5.

Said discharge outlets 6 are arranged along a circumference having a greater diameter than the diameter of a circumference which circumscribes the perimeter 8 of portion of the lamination means 10, 11 which is connected to the blind end 5, as more clearly shown by the cross-section of FIG. 5.

Figure 2:
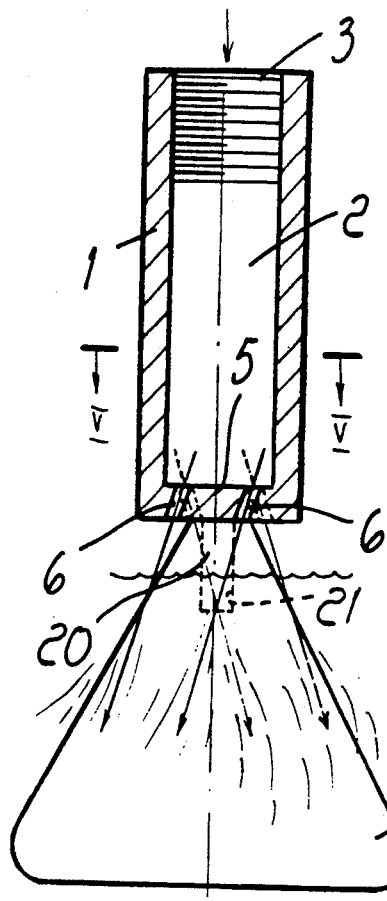
FIG. 2 is a sectional elevation view of the embodiment of FIG. 1.
Figure 3:
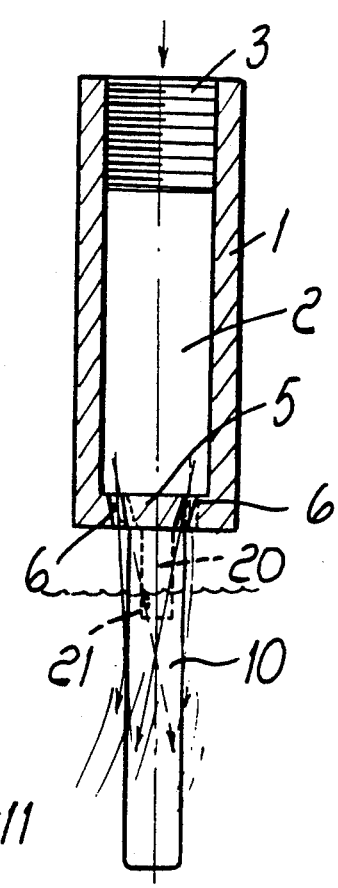
FIG. 3 is a perspective view of a second embodiment of the steam ejection nozzle according to the invention.
Figure 4:
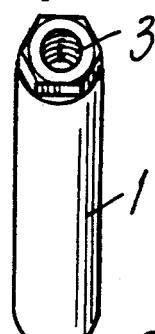
FIG. 4 is a sectional elevation view of the embodiment of FIG. 3.

Said discharge outlets 6 directions, designated by the arrows which exit from said outlets 6, as shown in figures 2, 4 and 5, which strike against the lamination means and are preferably inclined with respect to the axis of the blind hollow element 1 and with respect to the axis of the lamination means.

In a first embodiment of the steam ejection nozzle according to the invention, the lamination means comprise a solid cylinder 10 which is fixed to the blind hollow element 1. In this embodiment, illustrated in FIGS. 1 and 2, the outlets 6 are orientated so as to create a lamination of the first fluid on the surface of the solid cylinder 10, so as to improve penetration of the jet of steam into the beverage or second fluid 7 (which can be constituted by milk, water, chocolate or the like) and to create a vortex inside said beverage 7, in order to facilitate the emulsification and foaming thereof.

In another embodiment of the steam ejection nozzle according to the invention the lamination means comprise a truncated-cone element 11 fixed to the body 1. In this embodiment, illustrated in FIGS. 3, 4, 5 and 6, the outlets 6 are orientated so as to produce lamination of the steam on the outer surface of the truncated-cone element 11, to improve penetration of the jet of steam into the beverage or second fluid 7 (which can be constituted by milk, water, chocolate or the like) and to create a vortex inside said beverage 7, in order to facilitate the emulsification and foaming thereof.

The configurations described above as preferred are those which, according to studies conducted by the Applicant, yield the best results; it is nevertheless possible to adopt other configurations.

The cone or cylinder may obviously be fixed to the end 5 of the body 1 in any convenient manner.

In the embodiments shown in FIGS. 2 and 4, the body 1 has a downwardly depending cylindrical protrusion 20 which is force-fitted into a correspondingly-shaped seat 21 formed in the cone 11 and in the cylinder 10. Alternatively, the body 1 and the lamination means 10, 11 can be manufactured in the form of a single monolithic element, or connected by other mechanical fixing means such as screw-thread means.

Figure 6:
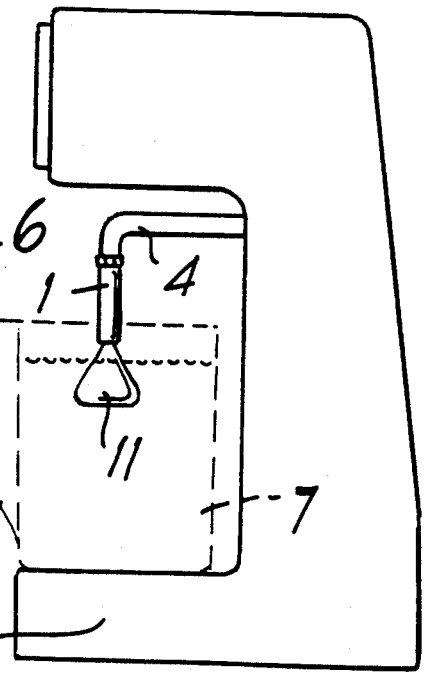
FIG. 6 is a lateral elevation view of an espresso coffee-making machine for household use equipped with a steam ejection nozzle according to the invention.

Operation is as follows, with reference to FIGS. 5 and 6. A coffee-making machine comprises a base 12, which comprises the water tank, the boiler, the connecting ducts and the control devices, and the steam delivery duct 4. A container 13 filled with the beverage 7 rests on the base 12. The lamination means, in this particular case the truncated-cone element 11, are partially immersed in the beverage 7. When steam is discharged from the discharge outlets 6 along the arrows of FIG. 5 which exit from said outlets, said steam produces a laminar flow on the surface of the truncated-cone element 11, which is partially immersed in the beverage 7. The jets of steam travel along the direction of the arrows indicated in FIG. 5 inside the beverage 7. In this manner a vortical motion is created in said beverage and causes the foaming of said beverage 7 with the air, obtaining the previously described foam effect.

It has been observed that the steam ejection nozzle according to the present invention achieves the intended aim and objects. The nozzle is easy to manufacture and capable of foaming the beverage without using moving mechanical parts and without defining regions which are difficult to clean.

Furthermore, the steam ejection nozzle according to the invention permits foam to be produced on beverages without requiring any particular skill to be exercised by the user even when used on household coffee machines wherein the steam pressure and temperature are significantly lower than the steam pressure and temperature produced by a professional machine.

The steam ejection nozzle thus conceived is susceptible to numerous modifications and variations, all of which are within the scope of the inventive concept.

All the details may furthermore be replaced with other technically equivalent elements.

In practice, the materials employed, as well as the dimensions, may be any according to the requirements.

I claim:

1. A combination of a steam ejection nozzle and a coffee-making machine, the coffee-making machine comprising means for producing steam and a steam delivery duct for delivering steam therefrom, said steam delivery duct having an end, the steam ejection nozzle being connected to said end of said steam delivery duct and comprising:

an end portion for receiving steam from said steam delivery duct;

a lamination means for being immersed into direct contact within a fluid to be injected with steam, said lamination means being connected to said end portion and extending therefrom; and at least one steam discharge outlet provided in said end portion and directed toward said lamination means for sending steam from said steam delivery duct into contact with said lamination means.

2. A combination of a steam ejection nozzle and a coffee-making machine according to claim 1, wherein said steam ejection nozzle comprises an elongated cylindrical body having a first open end which is connected to said end of said steam delivery duct and a second end which constitutes said end portion, a chamber being defined in said cylindrical body extending from said first end to said second end thereof, said lamination means extending from said second end and an axis of said steam ejection nozzle being defined which extends symmetrically through said cylindrical body and said lamination means, said lamination means having a first end which is connected to said second end of said cylindrical body and which defines an outer circular perimeter, said steam ejection nozzle comprising a plurality of said steam discharge outlets arranged circumferentially in a circular path about said axis and outside of said outer circular perimeter.

3. A combination of a steam ejection nozzle and a coffee-making machine according to claim 2, wherein said lamination means is constituted by a cylindrical element, said steam discharge outlets extending in directions toward said cylindrical element.

4. A combination of a steam ejection nozzle and a coffee-making machine according to claim 2, wherein said lamination means is constituted by a truncated cone element, said steam discharge outlets extending in directions which each have a first component which is parallel to said axis and a second component which is tangent to said circular path.

* * * * *